Patented June 2, 1953

2,640,837

UNITED STATES PATENT OFFICE 2,640,837

PROCESS FOR THE PREPARATION OF PECHMANN DYE

James Chen-Shang Fang, Sharon Hill, Pa., and Werner Bergmann, New Haven, Conn., assignors to American Cyanamid Company, New York, N. Y., a corporation of Maine No Drawing. Application October 30, 1951, Serial No. 253,974. In Canada August 24, 1951

15 Claims. (Cl. 260—343.6)

1

The present invention relates to an improved process of producing the red coloring matter known to chemists as the "Pechmann Dye" and derivatives.

In 1882, von Pechmann (Ber. 15, 881–892) obtained a red dye when he heated beta-benzoylacrylic acid in acetic anhydride. The generally accepted structure of the dyestuff is as follows:

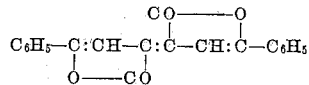

It has not been possible, up to the present time, to determine the formula of the dye with complete certainty, but the generally accepted formulation is the only one explaining its properties and formation from two molecules of beta-benzoylacrylic acid with the elimination of two molecules of water.

Despite the desirable technical properties of the Pechmann dye, it has achieved no practical utility, because the yields are low and are so erratic as to preclude economic production. While Pechmann reported a yield of 45% in the most favorable case, no worker since him has ever obtained yields of such magnitude. Modern work (1934) resulted in yields from 5–7% (Dufraisse and Chovin, Bull. Soc. Chim. (5), 1, 781) and applicants have never been able to obtain yields of more than 10%, and this only occasionally, when following the Pechmann process.

According to the present invention, it has been found that consistently high yields, ranging up to 70%, are achieved when the reaction is carried out in the presence of a cupriferous substance and an ammonium salt of a mineral acid.

The cupriferous substance may be metallic copper or its ordinary salts, such as the cuprous or cupric chlorides, bromides, sulfates, acetates, iodides, cyanides, tartrates and the like. The chlorides, being cheap and giving excellent results, are preferred.

The ammonium salts may be of any mineral acid, such as the chloride, sulfate, bromide, nitrate and the like. Again, because of its convenience, the chloride is the preferred reagent.

It does not appear to be particularly material whether the copper-containing substance and ammonium salt are added in any particular order to the reaction mixture. It is probable that in the reaction itself, a cuprammonium complex exists, although, for convenience in the present specification, the cupriferous substance and ammonium salt will be referred to as separate entities.

2

The cupriferous substance and ammonium salt undoubtedly exert some catalytic effect in the reaction. However, they are not used in minute amounts, as in the case of some catalysts; and, on the contrary, are present in amounts representing a substantial fraction of the stoichiometrical equivalent. The exact amount of the cupriferous substance and ammonium salt are not at all critical, but, of course, large excesses are to be avoided, as they increase the cost of the process.

It is an advantage of the present invention that a readily stirrable reaction medium can be used, namely, the lower aliphatic anhydrides. Acetic anhydride, being the cheapest of the members of this series, is preferred. However, the reaction is in no sense dependent on the use of acetic anhydride and other lower aliphatic anhydrides, such as those of propionic and butyric acids, may be used. Anhydrides of acids having more than four carbon atoms, insofar as they are liquid at reaction temperature, may also be employed, but their increased cost does not warrant their use in practical, commercial operation. The invention, however, broadly includes the use of any lower aliphatic acid anhydride as a reaction medium.

The reaction proceeds smoothly, requiring no special techniques nor any particularly critical control. The Pechmann dye produced separates out readily in a crystalline state and can be recovered by filtration and purified by extraction or recrystallization from suitable solvents.

The present invention is not limited to the preparation of Pechmann's dye from benzoylacrylic acid, but includes also derivatives in which the ring of the benzoyl radical may be substituted by substituents such as nitro, halogen, aryl, alkyl, ethoxy, etc.

It is another feature of the present invention that it is not necessary to use the corresponding pre-formed benzoylacrylic acid. On the contrary, compounds which, under the reaction conditions, yield benzoylacrylic acid may also be employed. Such compounds are notably those in which the double bond has been hydrated, such as beta-benzoyllactic acid. The exact mechanism with these benzoylacrylic acid-yielding compounds is not known and it is not intended to limit the invention to any particular theory or mechanism. However, it seems probable that the dehydration to the benzoacrylic acid may be the first step in the reaction.

The invention will be described in greater de-

Example 1

A mixture of 50 parts of beta-benzoylacrylic acid, 9.0 parts of cuprous cyanide and 11.0 parts of ammonium chloride is refluxed in 270 parts of acetic anhydride until reaction is substantially complete. The mixture is then cooled and filtered. The product is washed with acetic acid followed by alcohol and water and is dried at 110° C. It is purified by extraction with toluene, followed by recrystallization from xylene. The yield of purified Pechmann dye is 60–65% of theory.

Example 2

A mixture of 50 parts of beta-benzoylacrylic acid, 10.0 parts of cuprous chloride and 11.0 parts of ammonium chloride is refluxed in 270 parts of acetic anhydride until reaction is substantially complete. The reaction mixture is worked up as described in Example 1, similar results being obtained. The yield is not much affected if only 1.0 part, instead of 10.0 parts, of cuprous chloride is used. If the cuprous and ammonium chlorides are both omitted in this procedure, the yield of product is of the order of 10%. If only one is present, the yields are higher than 10% but much lower than those obtained with both together. If the usage of ammonium chloride is half that given above, the yield of product is somewhat lower, but still far higher than that obtainable without these catalysts.

It will be noted that neither the cupriferous substance alone nor the ammonium salt alone constitutes an effective condensing agent. Both must be present in substantial amounts.

Example 3

Fifty-five (55) parts of beta-benzoyllactic acid is refluxed in 400 parts of propionic anhydride, together with 10.0 parts of cuprous chloride and 11.0 parts of ammonium chloride until reaction is substantially complete. On working up the reaction mixture in the usual way, there is obtained a 70% yield of purified Pechmann dye.

Results are similar if butyric anhydride is used, instead of propionic.

Example 4

Fifty-five (55) parts of beta-benzoylacrylic acid is refluxed, together with 3.0 parts of powdered copper and 11.0 parts of ammonium chloride, in 270 parts of acetic anhydride until reaction is substantially complete. The reaction mixture is worked up in the usual way, giving a 55–60% yield of Pechmann dye. In the absence of ammonium chloride, copper powder alone is ineffectual as a catalyst.

Example 5

Fifty-five (55) parts of beta-benzoylacrylic acid is mixed with 13.0 parts of cupric chloride and 11.0 parts of ammonium chloride and refluxed in 270 parts of acetic anhydride until reaction is substantially complete. The reaction mixture is worked up as described in the foregoing examples, similar results being obtained.

Example 6

A mixture of 50 parts of benzoylacrylic acid, 10.0 parts of cuprous chloride and 11.0 parts of ammonium chloride is refluxed in 360 parts of propionic anhydride until reaction is substantially complete. From the reaction mixture there is obtained, by the procedures described above, a yield of about 55% of purified Pechmann dye.

Example 7

A mixture of 50 parts of benzoylacrylic acid, 15.0 parts of cuprous bromide and 11.0 parts of ammonium chloride is refluxed in 270 parts of acetic anhydride until reaction is substantially complete. The product is worked up and purified in the usual manner and is obtained in high yield.

Example 8

The procedure of the preceding example is followed, replacing the cuprous bromide by 19.0 parts of cuprous iodide. The product is obtained in excellent yield.

Example 9

Fifty (50) parts of beta-benzoylacrylic acid, 10.0 parts of cuprous chloride and 13.6 parts of ammonium sulfate are refluxed in 270 parts of acetic anhydride until reaction is substantially complete. The Pechmann dye is isolated in the usual manner.

Example 10

A mixture of 15.0 parts of beta-m-nitroyl-benzoylacrylic acid, 5.0 parts of cuprous chloride, 10.0 parts of ammonium chloride, and 270 parts of acetic anhydride are refluxed until reaction is complete and cooled thoroughly. The solid product is filtered and washed with acetic acid or ethanol, followed by ether. It is purified by extraction from a thimble with boiling xylene, giving a good yield of a dark red microcrystalline cuprous chloride and ammonium chloride.

Example 11

A mixture of 10.0 parts of beta-p-phenyl-benzoyl acrylic acid, 5.0 parts of cuprous chloride, 10.0 parts of ammonium chloride, and 108 parts of acetic anhydride is refluxed until reaction is complete, cooled, and filtered. The resulting red solid is washed with acetic acid or ethanol, followed by ether. It may be purified by extraction with boiling toluene and recrystallization from xylene. The yield is about 80% of theoretical or more. It melts at approximately 297° C. and sublimes on strong heating.

In the absence of catalyst, the yield is very much less.

Example 12

A mixture of 50.0 parts of beta-p-anisoyl-acrylic acid, 10.0 parts of cuprous chloride, 11.0 parts of ammonium chloride, and 270 parts of acetic anhydride is refluxed until reaction is complete, cooled, and filtered. Additional product may be obtained by diluting the mother liquors with 50 parts of boiling water. The product is washed with acetic acid and alcohol and dried. It may be purified by Soxhlet extraction with toluene, to give the red product in a yield of over 80% of theory.

The yield is very much less in the absence of cuprous and ammonium chlorides.

Example 13

The procedure of Example 1 is followed substituting p-toluylacrylic acid for the benzoylacrylic acid. An excellent yield of the 4,4'-dimethyl derivative of the Pechmann dye is obtained.

This application is in part a continuation of our co-pending application, Serial No. 200,503, filed December 12th, 1950.

We claim:

1. A process of preparing the "Pechmann Dye" which comprises heating a substance selected from the class consisting of para-substituted and unsubstituted beta-benzoylacrylic acids and beta-benzoyllactic acids in a reaction mixture comprising a lower aliphatic acid anhydride in the presence of a condensing agent consisting of a mixture of cupriferous substance and an ammonium salt of a mineral acid.

2. A process of preparing the "Pechmann Dye" which comprises heating a beta-benzoylacrylic acid in a reaction medium comprising the anhydride of a lower aliphatic acid and in the presence of a condensing agent comprising a mixture of a cupriferous substance and an ammonium salt of a mineral acid.

3. A process of preparing the "Pechmann Dye" which comprises heating a substance selected from the class consisting of unsubstituted beta-benzoylacrylic acid and beta-benzoyllactic acid in a reaction mixture comprising a lower aliphatic acid anhydride in the presence of a condensing agent consisting of a mixture of cupriferous substance and an ammonium salt of a mineral acid.

4. A process of preparing the "Pechmann Dye" which comprises heating beta-benzoylacrylic acid in a reaction medium comprising the anhydride of a lower aliphatic acid and in the presence of a condensing agent comprising a mixture of a cupriferous substance and an ammonium salt of a mineral acid.

5. A process according to claim 4 in which the anhydride is acetic anhydride.

6. A process according to claim 5 in which the cupriferous substance is metallic copper.

7. A process according to claim 6 in which the ammonium salt is an ammonium halide.

8. A process according to claim 6 in which the ammonium halide is ammonium chloride.

9. A process according to claim 4 in which the cupriferous substance is a copper salt.

10. A process according to claim 9 in which the aliphatic anhydride is acetic anhydride.

11. A process according to claim 10 in which the ammonium salt is an ammonium halide.

12. A process according to claim 11 in which the ammonium halide is ammonium chloride.

13. A process according to claim 12 in which the copper salt is a copper halide.

14. A process according to claim 12 in which the copper halide is a copper chloride.

15. A process according to claim 3 in which the lower aliphatic anhydride is acetic anhydride.

JAMES CHEN-SHANG FANG.
WERNER BERGMANN.

No references cited.